Nov. 7, 1950   L. O. BALLARD ET AL   2,528,679
SPIRAL BLADE CONVEYER
Filed Nov. 18, 1946   2 Sheets-Sheet 2
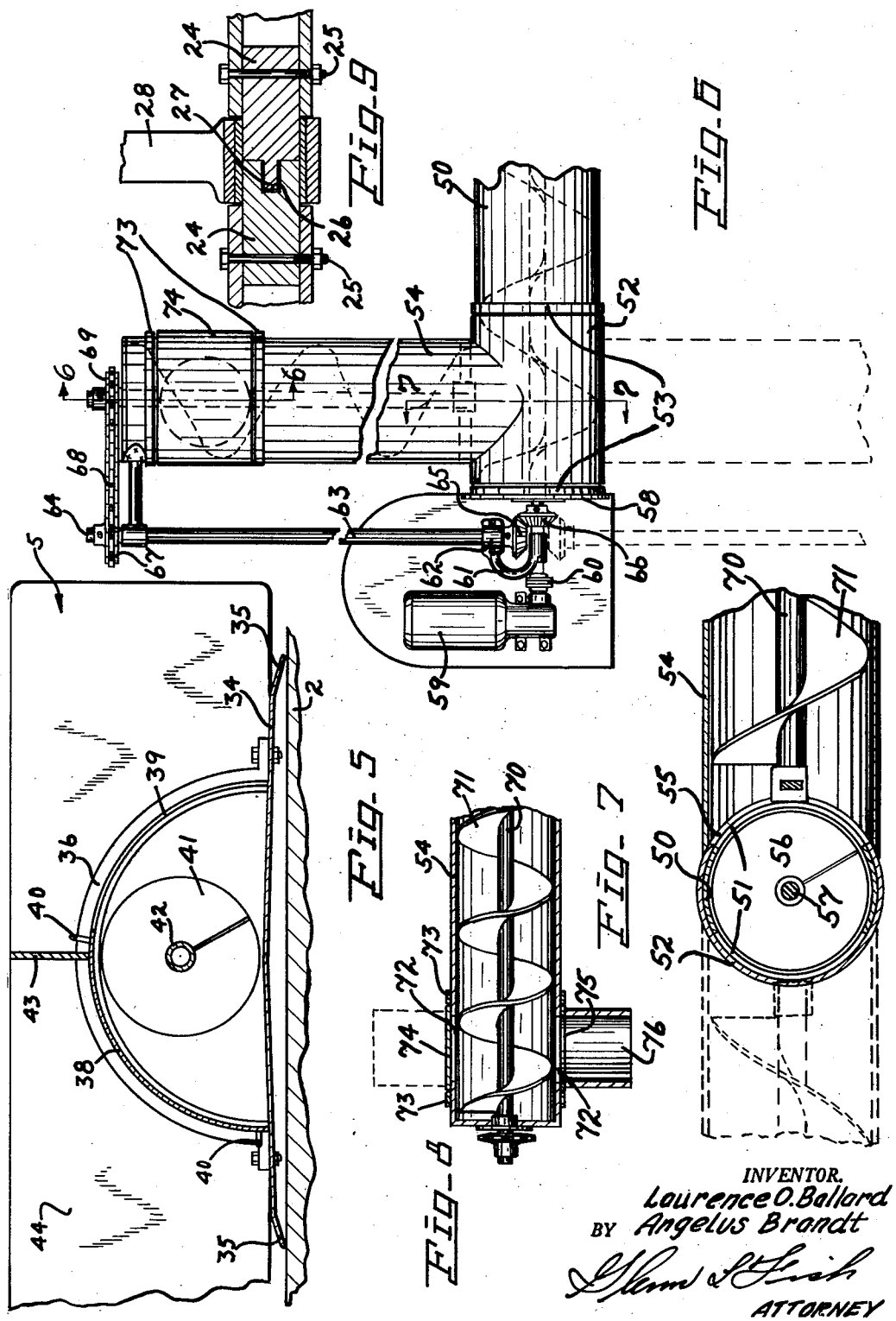
INVENTOR.
Laurence O. Ballard
BY Angelus Brandt
ATTORNEY Patented Nov. 7, 1950

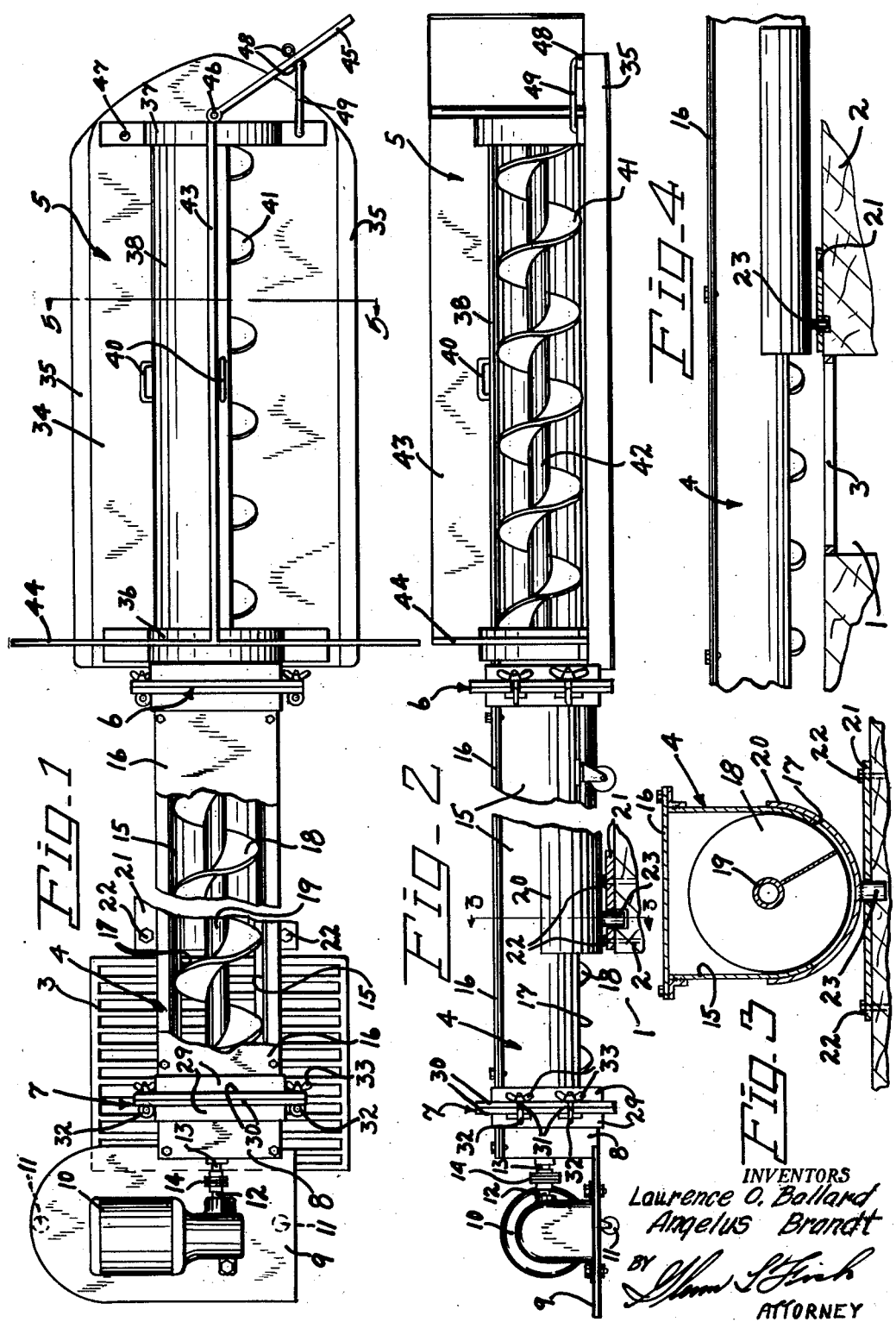

2,528,679

UNITED STATES PATENT OFFICE 2,528,679

SPIRAL BLADE CONVEYER

Laurence O. Ballard and Angelus Brandt, Spokane, Wash.

Application November 18, 1946, Serial No. 710,506

6 Claims. (Cl. 198—213)

This invention relates to a conveyor of the screw or spiral blade type and it is one object of the invention to provide a conveyor which is of such construction that it may be very effectively used for removing grain or other free flowing material from a store room, grain elevator, or box car and deliver the grain to another conveyor or into a truck for transporting the grain from the elevator or box car.

Another object of the invention is to provide a conveyor having companion sections which are detachably connected with each other so that during use of the conveyor it may be lengthened when needed.

Another object of the invention is to provide a conveyor having a rear section constituting an inlet section for the conveyor and so constructed that grain may enter this section from either side thereof, guide plates or shields being provided for directing the grain toward the entrance of this section.

Another object of the invention is to provide a conveyor which is driven by a motor connected with the outer or front end of the shaft of the spiral conveyor.

Another object of the invention is to provide a conveyor having an auxiliary section which is used when unloading a box car, the auxiliary section being so formed and mounted that it may be shifted from a position for discharging grain through a door at one side of a freight car to a position for discharging the grain from the door at the other side of the car.

Another object of the invention is to provide a conveyor wherein the auxiliary section is driven from the motor which operates the screw or spiral blade of the main conveyor.

Another object of the invention is to provide a conveyor of this character which is of simple construction, easy to install in position for use, and not liable to become broken or otherwise rendered inoperative when in use.

The invention is illustrated in the accompanying drawings wherein:

Fig. 1 is a top plan view of the improved conveyor.

Fig. 2 is a side elevation thereof.

Fig. 3 is a transverse sectional view taken along the line 3—3 of Figure 2.

Fig. 4 is a fragmentary view showing a portion of the front section of the conveyor in side elevation and mounted over an outlet grill of a grain elevator of a storage bin.

Fig. 5 is a transverse sectional view taken along the line 5—5 of Figure 1.

Fig. 6 is a top plan view of a modified form of front section used for unloading grain from box cars.

Fig. 7 is a fragmentary sectional view taken along the line 7—7 of Figure 6.

Fig. 8 is a sectional view taken along the line 6—6 of Figure 6.

Fig. 9 is a fragmentary sectional view showing the manner in which shafts of the conveyor screws are connected with each other.

This improved conveyor is used for removing grain from a large storage bin, grain elevator, freight car or the like. Grain elevators and large storage bins are customarily provided with an outlet 1 on the floor 2 so that grain may be discharged through the outlet to a conveyor mounted under the outlet opening and a grill 3 is provided for guarding the outlet. After grain over the outlet has flowed through the grill, grain must be moved toward the outlet and this is tedious and disagreeable work as dust and dirt stirred up by shoveling the grain toward the outlet makes it difficult to breathe and a workman can only stay in the elevator compartment a short period of time. By using the conveyor constituting the subject matter of this invention, grain may be moved from a pile of grain in an elevator chamber toward the outlet after gravity flow of grain stops and a workman need only enter the grain compartment or chamber when it is necessary to lengthen the conveyor.

This improved conveyor has a front section 4 and a rear section 5 which are detachably connected with each other by a coupling 6, a similar coupling 7 being provided for connecting the front end of the section 4 with a head or housing 8 carried by a base plate 9 upon which a motor 10 is mounted. Castors 11 are mounted under the base plate so that it may be readily moved along the floor of the elevator chamber when necessary. The shaft 12 of the motor is connected with the rotary shaft 13 of the housing or head 8 by a coupling 14 so that the shaft 13 will be rotated when the conveyor is in operation.

The front section 4 has a trough-shaped tubular body 15 closed at its top by a closure plate 16 and the front end portion of the tube 15 has its bottom cut out to provide an opening 17 through which grain may flow and pass downwardly through the grill 3 to the previously mentioned conveyor which carries the grain away from the elevator to a place where it is to be used or delivered into trucks. A screw conveyor 18 extends longitudinally in the trough or tubular casing 15 and the front end of its shaft 19 is connected with the shaft 13 so that the conveyor 18 will be rotated and grain moved forwardly through the tube 15 during operation of the conveyor. The tube should be prevented from having transverse movement out of alignment with the head or housing 8 and in order to do so there has been provided a trough-shaped saddle 20 which extends longitudinally of the casing 15 and into which the casing snugly fits. This saddle rests upon a plate 21 which is secured upon the floor 2 by a suitable number of nails 22, and through the plate is formed an opening to receive a lug 23 projecting downwardly from the saddle.

The shafts 13 and 19 are connected with each other as shown in Figure 9, and referring to this figure it will be seen that the ends of the hollow shafts carry blocks 24 which are secured in the shafts by bolts 25. One of the blocks is formed with a socket 26 to receive a squared stem 27 projecting from the other block and causes the two blocks and the shafts to turn together. The blocks project from the shafts and are rotatably mounted through a bearing bracket 28 mounted in the coupling 7. The coupling consists of companion annular sections or collars 29 which fit tightly about the housing 8 and the trough shaped casing 15 and have outstanding flanges 30 which have abutting engagement with each other and are formed with slots 31 to receive bolts 32 carrying winged nuts 33. When the nuts are tightened the two collars will be firmly secured together and the casing of the conveyor section 4 will be held in engagement with the head or housing 8 and the shafts 13 and 19 held in driving engagement with each other.

The rear section 5 of the conveyor has a base plate 34 having bevelled edge portions 35 so that grain may easily flow onto the base plate when the base plate is thrust into the lower portion of a pile of grain. A casing is carried by the base plate and has end plates or heads 36 and 37 between which extends a hood 38 which is arcuate in cross section and has its ends mounted in arcuate grooves or tracks 39 formed in the head plates. By so forming and mounting the hood it may be grasped by one of the handles 40 and moved to a position disposing it at a desired side of the casing and thus leave one side of the casing open so that grain may flow into the casing through the open side thereof. A screw conveyor 41 having a tubular shaft 42 extends longitudinally of the casing with end portions of the shaft rotatably mounted in bearings disposed centrally of the heads or end plates. The head 36 is formed with an opening bordered by its track 39 so that grain may pass from the conveyor section 5 to the conveyor section 4 and the shaft 42 is connected with the adjoining end of the shaft 19 of the conveyor section 4 by a coupling corresponding to that connecting shaft 19 with shaft 13, the coupling 6 serving to connect the front end of the conveyor section 5 with the casing 15 of the conveyor section 4 and being of the same construction as the coupling 7. A plate 43 which extends between the end plates or heads 36 and 37 serves to brace these end plates and also serves as a shield or guard plate to prevent grain from flowing over the hood 38. In addition to the guard plate 43 there has been provided a guard plate 44 which extends along the end plate 36 and across the front end of the base plate 34 with its end portions projecting from side edges of the base plate and will very effectively prevent grain from flowing beyond the front end of the base plate or over the head 36. At the rear end of the conveyor section is a shield or guard plate 45 which is pivoted to the guard plate 43 and the end plate or head 37, as shown at 46, and may thus be swung to a position in which it projects diagonally from a desired side of the casing and the base plate. Sockets 47 are formed near opposite sides or ends of the head 37 and at opposite sides of the guard plate or shield 45 are eyes or sockets 48. Therefore after the shield has been swung to a position in which it projects diagonally from a desired side of the base plate a bracing bar 49 having depending arms at its ends may be detachably engaged with the shield and the head and hold the shield in the adjusted position. The shield will then aid in directing grain toward the open side of the casing and a good supply of grain will be provided for movement longitudinally of the conveyor section 5 and into the casing of the section 4. As the quantity of grain in the elevator or bin is reduced and distance between the grain and the outlet 1 increases additional conveyor sections 4 may be installed to lengthen the conveyor.

In Figures 6, 7, and 8 there has been shown a conveyor for use in a box car. In this embodiment of the invention a conveyor section having a tubular casing 50 is used. This tubular casing may be connected with the front end of the conveyor section 4 or directly with the section 5 and any number of the casings 4 may be used to provide a conveyor of the necessary length. It will also be understood that means other than a casing section 5 may be employed for directing grain into the rear end of the tube 50. Side openings 51 are formed near the front end of the tube 50 and about the front end portions of the tube is mounted a collar 52 which is rotatably held in place by rings 53 and carries a pipe 54 which projects laterally from the tube or casing 50. Within the pipe 54 the sleeve or collar is formed with a side opening 55 which registers with one of the side openings 51 of tube 50 according to the direction in which the pipe 54 projects from the tubular casing. A screw conveyor 56 extends longitudinally through the tube 50 with its shaft 57 projecting through the head 58 at the front end of the casing and connected with the shaft of the motor 59 by a coupling 60. A bracket 61 is mounted loosely about the shaft and at its outer free end is provided with a clamp 62 secured about a tubular shaft casing 63 through which extends a rotary shaft 64. At its inner end the shaft 64 carries a bevelled gear 65 meshing with a bevelled gear 66 carried by the shaft 57 so that rotary motion will be transmitted to shaft 64, and at its outer end the shaft 64 carries a sprocket wheel 67 about which is trained a sprocket chain 68. This chain engages about a sprocket wheel 69 carried by the outer end of the shaft 70 of a screw conveyor 71 extending longitudinally in the pipe 54, and upon referring to Figure 8 it will be seen that the conveyor 71 will move grain through the pipe to the outer end thereof where it will flow outwardly through the lower one of the side openings 72 formed in opposite sides of the pipe. Since the bracket is loosely mounted about the shaft 57 the pipe may be swung about the tube 50 to a position in which it will extend from a desired side thereof and out through a desired side door of a box car. Between rings 73 a collar 74 is rotatably mounted about the outer end portion of the pipe and this collar is formed with a side opening 75 about which is mounted a neck 76 through which grain flows after passing through the lower one of the openings 72 in the pipe. Since the neck will be disposed over a truck or a conveyor of conventional formation grain may be discharged from the box car and transported to a predetermined place for use.

Having thus described the invention, what is claimed is:

1. A conveyor for delivering loose running material to an outlet of a storage chamber comprising front and rear sections having casings detachably coupled in end to end relation to each other, screw conveyors in said casings having ends detachably connected with each other, the front casing having an outlet opening in its bottom, a cradle for mounting the front casing in position to dispose its outlet over the outlet of the storage chamber, a head detachably mounted at the front end of the casing of the front section and having therein a rotatable drive shaft connected with the screw conveyor of the front section and projecting forwardly from the head, a base plate, and a motor mounted upon the base plate and having its shaft connected with the protruding front end of the shaft in said head.

2. A conveyor for delivering loose running material to an outlet of a storage chamber comprising front and rear sections having casings detachably coupled in end to end relation to each other, screw conveyors in said casings having ends detachably connected with each other, the front casing having an outlet opening in its bottom, the rear casing having a closure movable transversely into position to provide an inlet along a selected side of the casing of the rear section, means for directing material into the rear casing through the open side thereof, and means for imparting rotary motion to the screw conveyor of the front section.

3. A conveyor for delivering loose running material to an outlet of a storage chamber comprising front and rear sections having casings detachably coupled in end to end relation to each other, screw conveyors in said casings having ends detachably connected with each other, the front casing having an outlet opening in its bottom, the rear casing having a closure movable transversely into position to provide an inlet along a selected side of the casing of the rear section, means for directing material into the rear casing through the open side thereof, a base plate adapted to be disposed forwardly of the outlet of the storage chamber, a motor mounted upon said base plate, and means for detachably connecting the shaft of said motor with the screw conveyor of the front section.

4. A conveyor for delivering loose running material to an outlet of a storage chamber comprising front and rear sections having casings detachably coupled in end to end relation to each other, screw conveyors in said casings having ends detachably connected with each other, the front casing having an outlet opening in its bottom, the rear casing having end members formed with arcuate tracks in their inner faces, a transversely arcuate closure extending between the end members and having their ends slidably engaged in the tracks to mount the closure for movement transversely of the casing and provide an inlet along a selected side of the casing, a baffle plate extending transversely of the casing along the front end member, a baffle plate extending longitudinally of the casing between the end members and disposed over the upper side edge of the closure in either of the adjusted positions thereof, a baffle plate pivoted to the rear end member for swinging movement to adjusted positions for extending transversely of the casing and beyond the open side thereof, a brace for the pivoted baffle, a motor, and means for detachably connecting the shaft of the motor with the screw conveyor of the front section.

5. A conveyor for delivering loose running material to an outlet of a storage chamber comprising front and rear sections each having a casing and a screw conveyor rotatably mounted therein, a saddle under the front section extending longitudinally thereof and open at its ends to permit shifting of the casing of the said front section longitudinally through the saddle, a plate under said saddle adapted to be secured upon a floor of the storage chamber back of the outlet thereof and formed with an opening, a lug projecting downwardly from the front end of the saddle and engaged in the opening of the plate to hold the saddle in place, and means for imparting rotary motion to the screw conveyor of the front section.

6. A conveyor for delivering loose material to an outlet of a storage chamber comprising front and rear sections each having a casing and a screw conveyor rotatably mounted therein, a coupling detachably connecting abutting ends of the casings of said sections and including collars carried by the casings and having outstanding flanges formed with registering slots through which pass bolts for releasably securing the collars together, a bearing mounted in the coupling, blocks carried by end portions of the shafts of the screw conveyors and projecting therefrom into the bearing, one block being formed with a socket and the other having a tongue removably fitting into the socket to cause turning of the rear conveyor with the front conveyor, and means for imparting rotary motion to the front conveyor.

LAURENCE O. BALLARD.
ANGELUS BRANDT.

REFERENCES CITED

The following references are of record in the file of this patent:

UNITED STATES PATENTS

| Number | Name | Date |
|---|---|---|
| 961,958 | Hartley | June 21, 1910 |
| 1,735,920 | Fitzhugh | Nov. 19, 1929 |
| 1,785,604 | Tellefsen | Dec. 16, 1930 |
| 2,045,757 | Constantin | June 30, 1936 |